April 15, 1969          U. UGOLINI          3,439,083
PROCESS FOR MANUFACTURE OF A MAT OR CARPET LIKE
THE TWO-COLOUR RUBBER MATS MOLDED
Filed June 15, 1966

INVENTOR:
UGOLINO UGOLINI by E. M. Squire

United States Patent Office 3,439,083
Patented Apr. 15, 1969

3,439,083
PROCESS FOR MANUFACTURE OF A MAT OR CARPET LIKE THE TWO-COLOUR RUBBER MATS MOLDED
Ugolino Ugolini, Via Pistoiese, 247, Florence, Italy
Filed June 15, 1966, Ser. No. 557,825
Int. Cl. B29c 9/00; B32b 31/20
U.S. Cl. 264—139                                2 Claims

ABSTRACT OF THE DISCLOSURE

A process for the manufacture of a two-color mat or carpet including the steps of preparing a die having a surface machined with relatively deep recesses and relatively shallow recesses, the shallow recesses flanking the deep recesses. Pressing moldable material of one color in the deep recesses thereby forming ribs of one color, and pressing moldable material of another color in the shallow recesses, the material of said one color being superimposed on the material of the other color. The shallow recesses form ribs of another color.

---

The purpose of the invention is to make two-colour mats or other articles (in the following specification compared to mats), made up of rubber or other materials, by means of a quick simple process, which minimizes labour and machining operations. In fact it excludes the expensive painting and subsequent lapping, as well as the pre-loading of the die deep portions with powders or pre-shaped or pre-contoured strips, for instance, in raw or vulcanized rubber. The process is highly economical, as it is reduced to the mere molding operation under the press like any other similar one-colour mat or article, with a loading comparable to that for a single-colour article. The appropriate arrangement of the die and the materials here used cause the mat to be finished after the pressing and vulcanization or other stabilization operation.

The process according to the invention for manufacturing mats like the rubber mats or the like, at least two coloured, or similar articles, comprises the stages of: preparing a die having a surface machined with first relatively deep recesses, to form in the mat projections of a first material, second less deep recesses flanking said first recesses to form shaped surfaces in a second material, and projections dividing said first recesses from said second ones; preparing a thickness to be molded, made of a first relatively thick layer in said first material, and a second thinner layer in said second material, said second layer being in contact with said surface of the die; pressing said thickness to be molded against said surface, whereby said second layer rests on said surface, excepted in said first first recesses, said second layer tearing in the length included between said projections flanking said first recesses, and said first material of said first layer invading said first recesses.

Said second layer is made up with such a material and is affected by the impressions of the die surface in such a manner whereby it is opened by the pressure exerted by the first layer, so that the most remarkable projections in the mat substantially appear to be of the material of the first layer. Said second layer may be made up of rubber and contain percentages of resins (plastic materials) and/or fibrous material or may be of any other appropriate nature to undergo the opening effect required, to be anchored or secured to the first layer and to form a surface of the finished article.

Shallower recesses (with respect to their width) may be advantageously provided in the die, on the sides of the deeper recesses, for the purpose of avoiding the opening of the layer directly contacting therein; thus there are formed, on the side of the more prominent projections, having a colour, less projecting and however wider projections, which have a different colour from that of the more prominent projections and which are designed to conceal the irregularities of the separation lines between the two colours upon the opening of the layer contacting the die machined surface.

The recesses will have configurations tending to retain the rubber or any other material of the layer contacting the die, as far as the recesses are concerned, which will set up projections having the colour of the material of said layer, and—with several features of a major depth and smaller width—as far as those are concerned which, vice versa, will preserve the rubber of the bottom layer, which has torn and passed over the layer contacting the die machined surface.

The invention will be better understood following the specification and the accompanying drawing, which illustrates an embodiment of the same invention, to form a mat with parallel ribs.

In the drawing:

FIG. 1 diagrammatically illustrates a portion of the die with the material layers arranged for the molding, in a vertical section;

Figure 1:
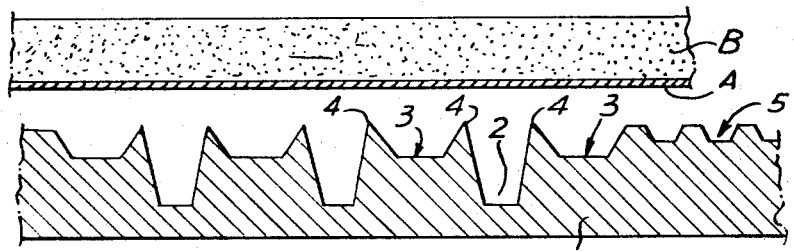
Figure 2:
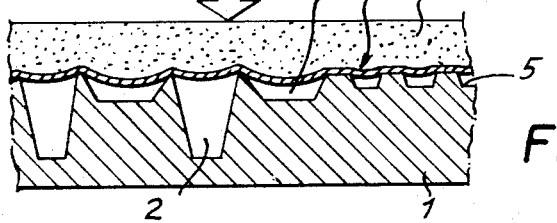
FIGS. 2 and 3 are similar to FIG. 1, but illustrate the assembly of the die during and after the pressing, that is, in the vulcanization conditions.
Figure 3:
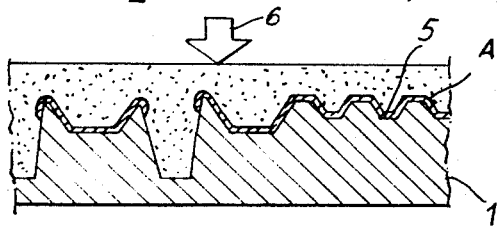
Figure 4:
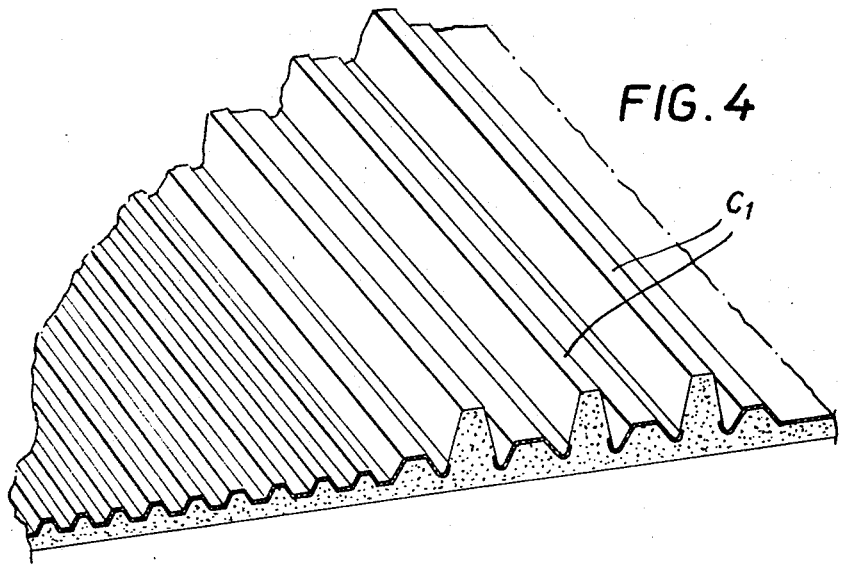
FIG. 4 illustrates a perspective sectional view of a mat obtainable with the process according to the invention.

According to what is illustrated in the accompanying drawing, 1 indicates the die portion, which is provided with the impressions for the forming of the ribs in the mat, on the section of the surface which is to be in two colours.

2 denotes the relatively very deep channels, which are flanked by channels 3, which are relatively shallower and are separated from the channels 2 by means of shaped or contoured shoulders 4. Additional shapings or contours as denoted by 5 may be provided on the surface of the element 1 of the die.

Two layers A and B respectively are laid on the element 1 of the die; the layer A contacts the element 1 and the layer B is superimposed thereon and is designed to form the bottom of the mat and a section of the visible surface of the mat, more particularly that designed to form the more projecting ribs defined by the channels 2. The material of the layer A may be of such a nature to yield by effect of a thrust; it may be a rubber layer and may include synthetic resins and/or suitable fibres, and said layer A may be eventually pre-vulcanized, at least partially; still the layer A may be of paper or felt fibres or the like, and however of a material withstanding wear and capable of being incorporated and adhering firmly to the material of the layer B.

By exerting a pressing with a second die element 6 on the layers A and B, the layer A is shaped along the contours 5 and along the contour of the less deeper channels 3, as the restricted depth of the contours 5–3 assures the preservation of the integrity of the layer A during the pressing operation; viceversa, the major depth of the channels 2 and the shaping of the ridges 4, which divide the channels 2 from the adjacent ones 3, impose on the one hand the opening of the layer A by effect of the pressure by the material of the layer B, which invades therefore the recesses of the channels 2; on the other hand, the shaping or configuration of the ridges 4 and the effect of the pull determined by the laying of the layer A onto the curvature of the channels 3, may determine a withdrawal or shrinkage effect of the opening lips of the layer A in correspondence of the channels 2, especially if there is an appropriate toughness for the layer A. Consequently the material of the layer A remains visible on the surface in correspondence of the contours 5 and of the contours of the channels 3, whereas in correspondence of the channels 2 the material B having a different colour appears.

There is consequently and directly by effect of the molding and vulcanization, the forming of a two-colour mat which is provided with more projecting ribs $C_1$ defined by the shaping of the channels 2 of the colour of the bottom material (material B), and less projecting surfaces shaped in a desired manner—apart the bond of the contour of the channels 3—which are formed by a different colour, which is that of the material A.

It is intended that the drawing only illustrates an embodiment given only as a practical demonstration of the invention, said invention being capable of being varied in the forms and arrangements without however departing from the scope of the concept which forms said invention. For instance, the invention contemplates the inserting between the two layers, of a third layer of a third colour, which in the zones in which it is arranged, appear in replacement of the layer B.

What I claim is:

1. Process for manufacturing multicolored mats comprising the steps of:

providing a die having a surface machined with decesses of at least two different depths with ridges surrounding the deeper recesses; contacting the die surface with a moldable thrust-yieldable material which will tear upon being forced into the deeper recesses of the die yet said material having sufficient toughness to contract upon relief of a deforming force; the material in contact with the face of the die being backed by a layer of differently colored moldable material of sufficient thickness to fill the recesses; pressing the layered materials so as to force the layers into the recesses with the material initially contacting the mold face tearing in the length included between the ridges flanking the deeper recesses and withdrawing from the deeper recesses; the material of the backing layer filling the deeper recesses thereby forming prominent projecting ribs of the backing material color in the deeper recesses which differ in color from the lesser projecting ribs surfaced with the initial layer, then stabilizing the formed mat.

2. The method of claim 1 further comprising the step of interposing in limited zones a third material of a third color over the initial layer between the two material layers; the third material filling the deeper recesses in limited zones upon pressing of the layered assembly.

References Cited

UNITED STATES PATENTS

| | | | |
|---|---|---|---|
| 2,647,852 | 8/1953 | Franklin | 154—118 |
| 2,772,501 | 12/1956 | Malcolm | 41—37 |
| 3,047,451 | 7/1962 | Beck | 156—219 |

ROBERT F. WHITE, *Primary Examiner.*

R. R. KUCIA, *Assistant Examiner.*

U.S. Cl. X.R.

156—250; 264—163, 245